(12) United States Patent
Audebert et al.

(10) Patent No.: US 7,615,753 B2
(45) Date of Patent: Nov. 10, 2009

(54) RADIATION DETECTING SYSTEM WITH DOUBLE RESETTING PULSE COUNT

(75) Inventors: Patrick Audebert, Varces Allieres et Risset (FR); Jean-Pierre Rostaing, La Cote Saint Andre (FR)

(73) Assignee: Commissariat a l'Energie Atomique, Paris (FR)

( * ) Notice: Subject to any disclaimer, the term of this patent is extended or adjusted under 35 U.S.C. 154(b) by 232 days.

(21) Appl. No.: 10/585,074

(22) PCT Filed: Dec. 29, 2004

(86) PCT No.: PCT/FR2004/003406

§ 371 (c)(1),
(2), (4) Date: Jan. 4, 2007

(87) PCT Pub. No.: WO2005/073757

PCT Pub. Date: Aug. 11, 2005

(65) Prior Publication Data

US 2007/0158551 A1    Jul. 12, 2007

(30) Foreign Application Priority Data

Dec. 30, 2003  (FR) .................................. 03 51223

(51) Int. Cl.
*G01N 23/00* (2006.01)
(52) U.S. Cl. ............................................. 250/370.07
(58) Field of Classification Search ............... 50/370.07
See application file for complete search history.

(56) References Cited

U.S. PATENT DOCUMENTS

| 3,883,756 | A | * | 5/1975 | Dragon ........................ 327/176 |
| 4,034,222 | A | | 7/1977 | Azam et al. |
| 4,198,986 | A | | 4/1980 | Suzuki |
| 4,591,984 | A | * | 5/1986 | Mori ...................... 250/363.07 |
| 5,233,180 | A | * | 8/1993 | Tsuruta et al. ........... 250/208.1 |
| 5,521,555 | A | * | 5/1996 | Tazartes et al. .............. 330/308 |
| 6,292,052 | B1 | * | 9/2001 | Carlson ......................... 330/9 |
| 2002/0098818 | A1 | * | 7/2002 | Yokogawa et al. .......... 455/255 |
| 2003/0086523 | A1 | * | 5/2003 | Tashiro et al. ................. 378/19 |

FOREIGN PATENT DOCUMENTS

| DE | 43 04 349 | 8/1994 |
| EP | 0 022 949 | 1/1981 |
| JP | 07 239385 | 9/1995 |

OTHER PUBLICATIONS

Jp 07-239385, JPO English translation.*
Chang, Zhong Yuan et al., "Low-noise wide-band amplifiers in bipolar and CMOS technologies", Kluwer Academic Publishers, No. XP008036864, pp. 153-195, 1991.

* cited by examiner

*Primary Examiner*—David P Porta
*Assistant Examiner*—Djura Malevic
(74) *Attorney, Agent, or Firm*—Oblon, Spivak, McClelland, Maier & Neustadt, L.L.P.

(57) ABSTRACT

A device for measuring exposure to radiations including at least a component for detecting photons including at least a component for detecting photons or particles associated with at least one circuit for acquiring and counting detection events. The response curve of the number of counted events versus the number of photons or particles sensed by each detection component is a monotonous increasing curve.

24 Claims, 7 Drawing Sheets

RADIATION DETECTING SYSTEM WITH DOUBLE RESETTING PULSE COUNT

TECHNICAL DOMAIN AND PRIOR ART

The present invention relates to the field of devices for measuring exposure to radiation and is generally applied to the detection of all types of radiations of a corpuscular or ondulatory nature, such as particle radiation and photon radiation, notably proton, neutron, electron or positron radiations, α, β, γ radiations, X-ray photons, visible light photons and photons outside the visible range.

In the state of the art, radiation detection devices are known, the structure of which is formed with one or several detector components associated with electronics for processing and counting pulses generated by the detection component upon the event of photon or particle capture.

In particular radiation measurement devices are known, which are configured according a matrix architecture which includes a detection entity associated with an electronic processing/acquisition entity.

The matrix assembly formed by the detection entity (commonly called <<detection circuit>>) associated with the electronic acquisition and counting entity (commonly called read-out circuit) forms a <<sensor>>.

The detection entity may be formed with a gas, a scintillator associated with a semi-conductor, or with layers of detecting material, which absorb photons or particles and finally convert them into electrical pulses (a packet of electron charges).

The expression <<packet of charges>> generally describes here, packets of positive or negative charges, notably of holes or electrons or positron-electron pairs.

The electronic entity is formed with a matrix configuration of electronic processing and acquisition circuits with the function of carrying out the counting of photon or particle detection events.

The electronic matrix circuits may be made in silicon technology, for example in the bipolar, CMOS or BiCMOS families.

The matrix sensors may be broken down into a network of pixels, each pixel being formed from the association of an elementary detector associated with a corresponding electronic acquisition chain.

The invention is generally directed to devices which include discrete detectors (or even a single detector unit) associated with respective acquisition chains, as well as to devices including an entity formed with a continuum of elementary detectors associated with a network of acquisition chains, such as for example X-ray imagers with a matrix architecture.

FIG. 1 illustrates a block diagram of the operation of a pixel acquisition chain according to the state of the art.

For each detector component DET (or group of elementary detectors), the electric pulses Qdet from the detector are processed (converted, amplified, filtered, shaped, etc.) by a processing circuit PPC, and then applied to a comparator CMP which delivers a calibrated pulse for each detected photon. These pulses then increment a digital counter BCC. At the end of the irradiation period, the counter BTC of each pixel therefore contains the number of photons detected by the pixel.

As schematized in FIG. 2 which illustrates a matrix architecture based on the acquisition chain of FIG. 1, one next proceeds with transferring DTR counting data towards an RDS read-out system. Read-out of the data may be performed line by line and column by column through matrix addressing or through a logical bus, towards a computing system of the imager.

In order to be able to count charges of a few thousands of electrons per pixel, the acquisition chain in particular provides the following functions:
- conversion of packets of charges into voltage,
- amplification of the signal,
- threshold crossing,
- incrementation of a counter, and,
- transfer of digital data towards a read-out or imaging system.

FIG. 3 illustrates a diagram of an electronic embodiment of a one-pixel acquisition chain with an analog portion PPC and a logic portion BCC, according to the state of the art.

The analog portion PPC has a structure with three functional stages known in the literature under the name of charge sensitive amplifier/shaper/comparator.

Such a conventional structure is described for example in the book by Z. Y. Chang & W. M. C Sansen entitled "Low noise wide-band amplifiers in bipolar and CMOS technologies", edited by Kluwer Academic Publishers, 1991, chapter 5.

The first CNVR stage corresponds to a charge sensitive amplifier (CSA) which provides a function for converting a packet of charges Qdet from the detector DET into a voltage pulse Scsa with maximum amplitude.

The CSA amplifier operates with a polarization current Ipol1 and provides an output signal Scsa. The CSA amplifier has a capacitance Cf for accumulating charge, located between the input IN and the output Scsa, which provides the conversion of Qdet charges into a voltage Scsa.

The CNVR circuit of the CSA amplifier includes a resetting RAZ device with a parallel back loop between the input IN and the output Scsa.

The RAZ device discharges the <<feedback>> capacitance Cf with a DC current with a maximum value Iraz1.

The DC discharge RAZ device consists of a resistor for example.

The second stage SHPR (<<shaper>>), includes a passband filter circuit with an AMP amplifier which provides the following functions:
- Voltage amplification gain: with the amplifier, it is possible to increase the useful amplitude of the output signal Samp which is applied to the comparator CMP in order to cause the useful signal to emerge from the noise and to get rid of the dispersions of the comparators;
- Noise filtering of the voltage pulse signal Scsa from the first amplifier CSA: filtering suppresses low frequency noise and limits the pass-band; the low frequency cut-off of the filter also suppresses common mode fluctuations related to pile-ups of events as detailed subsequently.

The amplifier AMP operates with a polarization current Ipol2 and provides at the output Samp a signal of shaped pulses. The SHPR circuit includes a first capacitor C1 inserted in series on the input (−) of the AMP amplifier and a second capacitor C2 positioned on a feedback loop between the input (−) and the output Samp.

According to the state of the art, a resistive component R2 is positioned in parallel to the capacitor C2 on the feedback loop in order to determine the cut-off frequency of the SHPR filter.

The voltage gain of the SHPR circuit is adjusted by the ratio of the capacitances −C1/C2.

The third stage CMPR has the function of comparing the potential of the Samp signal relatively to a voltage threshold Vth, and in the case of detecting a crossing of the threshold, of producing a comparison signal Scomp pulse, here with a high level.

A circuit LOGT with logic gates reshapes the comparison level pulses Scmp into calibrated pulses of logic state 0 or 1 in order to properly increment the binary counter CNT, in a manner analogous to square pulses of the clock signal.

The main difficulty in AQC acquisition chains is to provide the charge/voltage conversion and then the amplification of very small packets of charges, while observing strong constraints for limiting consumption, in particular in matrix architectures, as well as constraints for having a sufficient signal-to-noise S/N ratio so as not to count false events.

To maximize the charges/voltage conversion rate in the CNVR circuit, the value of the capacitance Cf is reduced to a minimum.

In practice, the capacitance Cf which provides the charge/voltage conversion, is reduced to the irreducible value of the parasitic capacitance of the amplifier CSA (a capacitance present between the input IN and the output Scsa) which is related to the implantation technology of the electronic circuit used.

The theoretical maximum amplitude of the pulses of the signal Scsa has the following limiting value:

$$Scsa_{Max} = \frac{Qdet}{Cf} = \frac{q \cdot N}{Cf}$$

With Qdet the value of a charge packet in Coulombs,

N the number of electrons/holes produced by detection of a photon or a particle;

q the elementary charge of the electron: $1.6 \, 10^{-19}$ C,

Cf the value of the capacitance IN/Scsa in Farads.

The existing devices have the drawback of suffering from several limitations.

The first limitation is due to the requirement of making a compromise between three performance parameters of the acquisition chain, i.e., the maximum counting frequency, the minimum amplitude of the pulse signals, and the overall consumption of the electronic acquisition circuits.

In order to increase the amplitude of the pulses, one may attempt to increase the voltage gain Gv (Gv=−C1/C2) of the second amplification stage SHPR. The polarization current Ipol2 of the amplifier AMP2 must then be increased, which limits the rise rate Ta of the signal Samp or else the value of the capacitance C1 must be increased.

But, increasing the polarization current Ipol2 of the amplifier AMP strongly increases the overall consumption of the acquisition chains. Now, detection devices especially with a matrix architecture have strong limiting constraints for the consumed current.

Increasing the capacitance C1 would amount to increasing the load impedance at the output of the amplifier CSA, which reduces the response amplitude Scsa of the first stage CNVR.

A compromise must therefore be made between the voltage gain Gv of the second stage SHPR and the response amplitude Scsa of the first stage CNVR, the amplification 'gains' of both stages CNVR and SHPR need to be adjusted together in order to reach an optimum.

In the optimized acquisition chains according to the state of the art, when a packet of charges Qdet from the detector DET reaches the input IN of the CSA amplifier, the discharge device RAZ of the CNVR circuit opposes this flux of charges Qdet and will partially compensate the incident charges before their entire conversion into voltage on the terminals of the capacitance Cf. Thus, it is realized that the maximum amplitude reached by the output signal Scsa of the converter stage is less than the third of the theoretical maximum amplitude $Scsa_{Max}$ (a phenomenon called a ballistic deficiency).

If one attempts to increase the amplitude of the signal pulses Scsa, one may reduce the value of the capacitance Cf or increase the polarization current Ipol1 of the CSA amplifier or even reduce the discharge current source RAZ. The value of the capacitance Cf cannot be reduced below the value of the input/output parasitic capacitance of the amplifier CSA.

As discussed earlier, increasing the polarization current Ipol1 of the CSA amplifier in order to increase the amplitude of the signal Scsa corresponding to given packets of charges, would once more amount to strongly increasing the overall consumption of the acquisition chains of the device which is strongly limited by constraint.

For example, additional currents Ipol1 and Ipol2 of one microampere represent in a matrix imager of 1,000×1,000 pixels, an excess consumption of a global current of 2 amperes. Such an intensity cannot be transmitted on power supply lines serving 1,000 pixels without any crippling loss of voltage. (Power drop constraints have to be observed).

The effect of a reduction in the value of the discharge current Iraz generated by the RAZ device is schematized in dashed lines in FIG. 4B.

With the diagram of FIG. 4B, it is possible to compare the operation of an optimized acquisition chain with a rated current Iraz1 (curve in solid lines) relatively to a non-optimized case with a current Iraz2 with a value much lower than Iraz1 (curve in dashed lines).

In this case, reduction in the Iraz2 current limits the effect of the discharge current RAZ during transfer of the charges Qdet into the capacitance Cf and a voltage pulse amplitude Scsa close to the maximum theoretical amplitude $Scsa_{Max}$ may be attained.

But the discharge time Td has the drawback of lasting for a considerably long time since the discharge current Iraz2 is reduced.

Subsequently, as indicated by FIG. 4B, the incident pulses of Qdet charges should be less frequent and the maximum counting frequency will be limited considerably.

Conversely, if one attempts to increase the maximum counting frequency, the discharge current Iraz needs to be increased. But consequently, as illustrated in dotted lines in FIG. 4B, the amplitude of the signal Scsa is weakened. The signal-to-noise ratio is then deteriorated.

Consequently, for a given consumption (Ipol1, Ipol2) in the existing devices, one is confronted with a limitation of the performances stemming from the required compromise between the maximum counting frequency and the amplitude of the pulse signals.

The devices of the state of the art have the drawback of having another limitation due to a problem of accumulation of pulses and of saturation, analogous to a <<dazzle>> phenomenon after each detection event.

As schematized in FIG. 4C, when the acquisition chain receives a burst of packets of charges Qdet', Qdet'', Qdet''', at a rate higher than the maximum rated counting frequency Nmax, the capacitance Cf does not have the time required for complete RAZ discharge, and the average level of the Scsa, Samp signals gradually increases without succeeding in falling down again to the idle level 0.

Therefore, there is a shift of the average voltage level of the signal Scsa which is reflected on the output signal Samp of the second stage SHPR.

This problem is known in the state of the art under the name of <<base line shifting>>.

The shifting of the average potential of the signal Samp applied to the input of the comparator CMP causes a constant level saturation at the output Scmp of the acquisition chain AQC.

Above a rate of detection events Nsat even larger than $N_{max}$, the acquisition chain no longer distinguishes the detection pulses from each other, the signals Scsa, Samp, Scmp remain completely saturated and the counter CNT does not record any pulse except for only the first front of the first pulse, resulting in an absurd counting result equal to one.

FIG. 5 illustrates the corresponding appearance of the response curve of the radiation measurement devices according to the state of the art.

Three distinct areas appear on this type of curve:
 a linear area [0; Nlin]: a rated operating area delivering a linear response;
 a non-linear area [Nlin; Nmax]: an operating area but in which the response is no longer linear;
 a decreasing area beyond Nmax: a <<forbidden>> area because the responses are unexploitable. To a counting result Ncnt=Namb may ambiguously correspond two numbers of detection events Ndet=Namb1 or Ndet=Namb2. Further, from a limiting number of events Nsat, the device counts the first event and remains saturated (all the pulses are piled up on each other), which is expressed by the count of a single event.

The object of the invention is to produce a radiation measurement device without the aforementioned drawbacks.

The first goal of the invention is to do away with the saturation problem of the acquisition chain and with the <<dazzle>> or <<event pile-up>> phenomenon of the detection device.

The second problem of the invention is to get rid of the compromise between the performance parameters of the device which are the maximum counting frequency, the amplitude of the pulse signals, and the overall consumption of the electronic entity of the device.

A particular goal is to increase the maximum counting frequency limit of a radiation measurement device.

Another particular goal is to increase the amplitude of the pulse signals in an acquisition chain and to enhance the signal-to-noise ratio in a detection device according to the invention, notably in an imaging device.

Another particular goal is to reduce the overall consumption of a radiation measurement device, notably in matrix devices.

Finally, another goal of the invention is to produce a matrix detection system acquisition chain with low bulkiness under a pixel, having low noise sources, low consumption, and an easily transposable design independently of the implantation technology, with preferably good reliability.

BRIEF DISCUSSION OF THE INVENTION

Succinctly, the invention consists in giving more importance to the charges/voltage conversion gain of the amplifier CSA circuit of the CNVR stage by minimizing the negative effect of the discharge current Iraz on the amplitude of the signal Scsa of detection pulses obtained at the output of the amplifier CSA.

For this purpose, the current Iraz is strongly reduced to an unconventional value Irazmin, taking into account the constraints on the counting frequency. With this, it is possible to make the most out of the available incident charges Qdet and subsequently switch the comparator CMP as fast as possible.

Once the pulse is detected, the generated pulse signal Scmp/Slog is used for interrupting the charge conversion process and the slow process for returning to equilibrium, slowed down because of the reduced current Irazmin. Such an interruption is advantageously provided by a feedback loop controlled by the signal Slog which acts on the charge converter stage CNVR via an electronic switch positioned in parallel to the continuous discharge device RAZ.

The invention notably provides the production of a device for measuring exposure to radiations comprising at least one component for detecting photons or particles associated with at least one circuit for acquiring and counting detection events, in which the response curve of the number of counted events versus the number of photons or particles sensed by each detection component, is a monotonous increasing curve.

More specifically, the response curve has a first response range which increases substantially linearly, the number of counted events increasing proportionally with the number of sensed photons or particles, followed by a second simply increasing response range, the number of counted events further increasing or remaining stable as long as the number of sensed photons or particles increases.

The invention provides that the acquisition circuit comprises a signal processing circuit delivering counting pulses corresponding to the detection events, the device comprising means for rapidly resetting the circuit for processing pulse signals.

The invention also relates to a detection device or device for measuring exposure to radiations comprising at least one component for detecting photons or particles, each detection component being associated with a chain for acquiring and counting detection events, the acquisition chain comprising a signal processing circuit delivering count pulses corresponding to the detection events, the device comprising a feedback or control loop controlling means for resetting the signal processing circuit. Advantageously, resetting is performed discontinuously in response to each detection pulse/event, immediately after the phase for converting charges from the pulse detector.

The invention may be embodied by having:
 means for triggering a reset current in a charge accumulation stage of the acquisition circuit; or,
 means for rapidly triggering, after each detection event, return to a polarization equilibrium point of a polarized amplification stage of the acquisition circuit; or
 means for discharging capacitive means of a charge accumulation stage, in response to each detected event, with preferably means for shortening the discharge of the capacitive means.

According to one embodiment of the invention, the device comprises means for generating two discharge current values in a charge conversion stage or means for switching the value of the discharge current in a charge accumulation amplifier stage.

Thus, the discharge current of the charge accumulation stage assumes a first value during idle times and a second value during the detection of an event, the second value being larger than the first value.

Advantageously, the value of the discharge current of the charge accumulation stage during idle times is set to a value of the order of the parasitic, leakage, or darkness current of the detector component.

According to another embodiment, the charge conversion stage includes a constant discharge current source and a triggered or switched discharge current source.

According to another aspect of the invention, the device comprises switching means capable of short-circuiting capacitive means of a charge conversion amplifier stage.

According to another aspect of the invention, the acquisition and counting circuit comprises a control or feedback loop between a point downstream from a charge accumulation stage and said stage. Advantageously, the feedback control loop retransmits count pulse signals and controls switching means connected to terminals of the charge accumulation stage.

Alternatively, the control loop controls a discharge current source.

Advantageously, with the invention, it is possible to increase the rise amplitude as well as its rapidity for reaching a given level of a signal of pulses emitted during each detection event while reducing the fall duration of said signal.

The invention still provides a method for acquiring and counting detection events applying a device for measuring exposure to radiations, comprising at least one detection component associated with at least one circuit for acquiring and counting detection events, the acquisition circuit comprising a signal processing circuit delivering count pulses corresponding to the detection events, the method including a step consisting of resetting the signal processing circuit discontinuously, in response to each detection pulse/event. Advantageously, resetting is performed rapidly, immediately after the phase for converting charges from the pulse detector.

Preferably, the method applies a step consisting of achieving a control for retransmitting the count pulse signals in order to control resetting. Advantageously, the control is looped back between a point downstream from a charge accumulation/conversion stage and said stage. According to one embodiment, the method includes a first step for continuously discharging a charge conversion capacitance, the resetting method consisting of shortening the first step with the other resetting step being performed after each incrementation of the counting means

SHORT DESCRIPTION OF THE FIGURES

Other objects, features, and advantages of the invention will become apparent upon reading the description of embodiments hereafter, with reference to the appended drawings, wherein.

Figure 10:
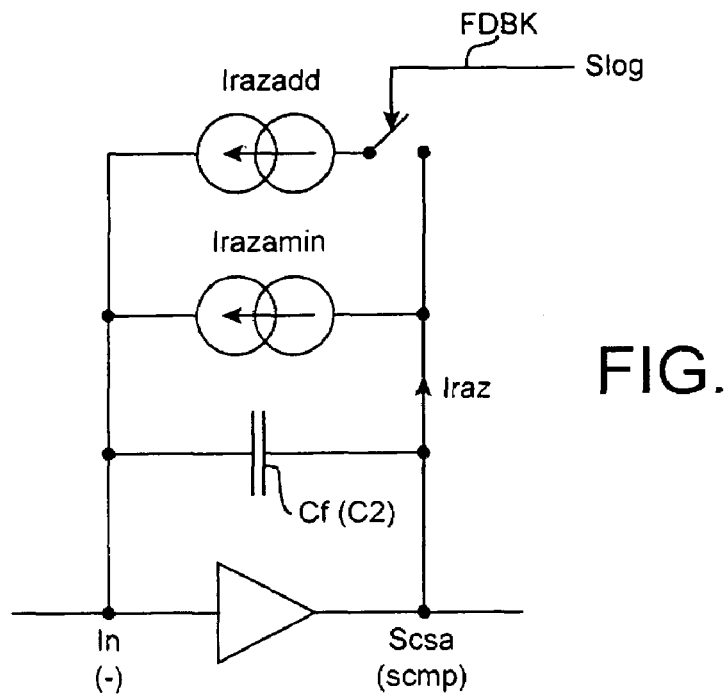

FIGS. 8A-8D schematically illustrate diagrams of pulse signals obtained in the acquisition circuit according to the invention;

FIGS. 9A-9F illustrate diagrams of measurement results of pulse signals obtained in an acquisition chain according to the invention;

FIG. 10 illustrates the diagram of a resetting device; and

Figure 11:
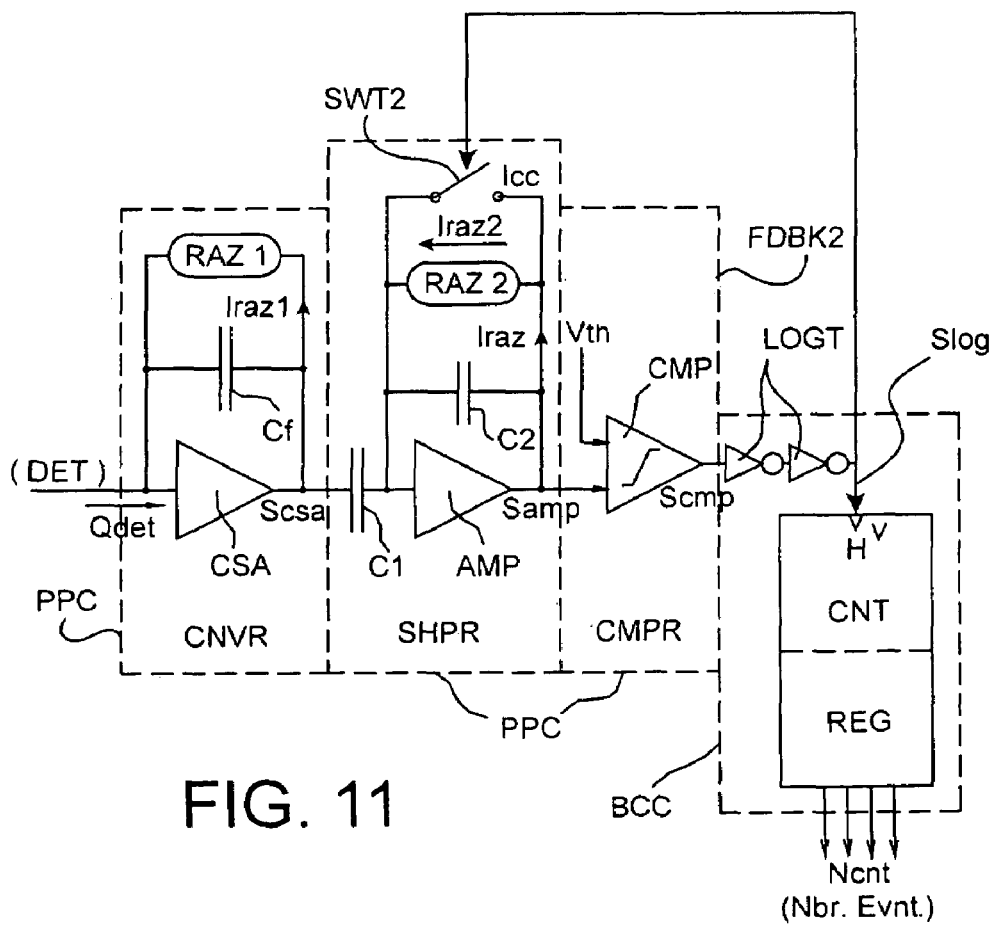

FIG. 11 illustrates another embodiment of the invention.

DETAILED DISCUSSION OF EMBODIMENTS OF THE INVENTION

Figure 7:
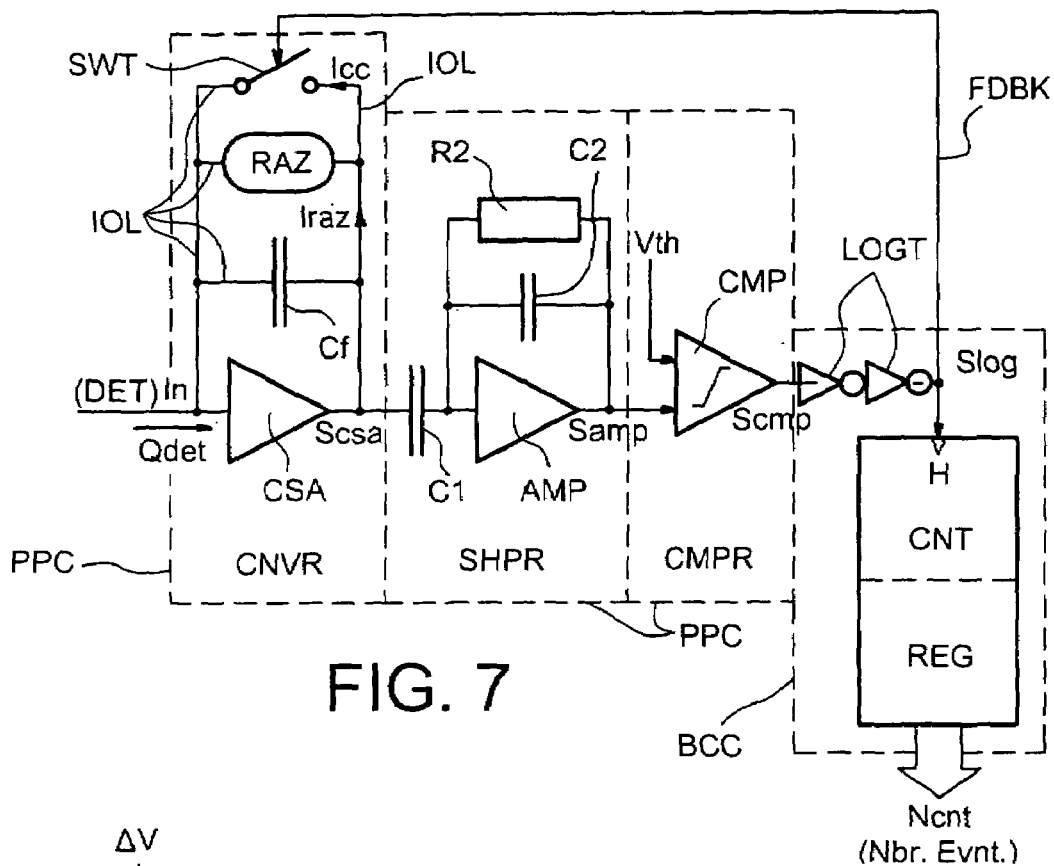
FIG. 7 illustrates an electronic wiring diagram of an acquisition and counting circuit according to the invention.
Figure 8:
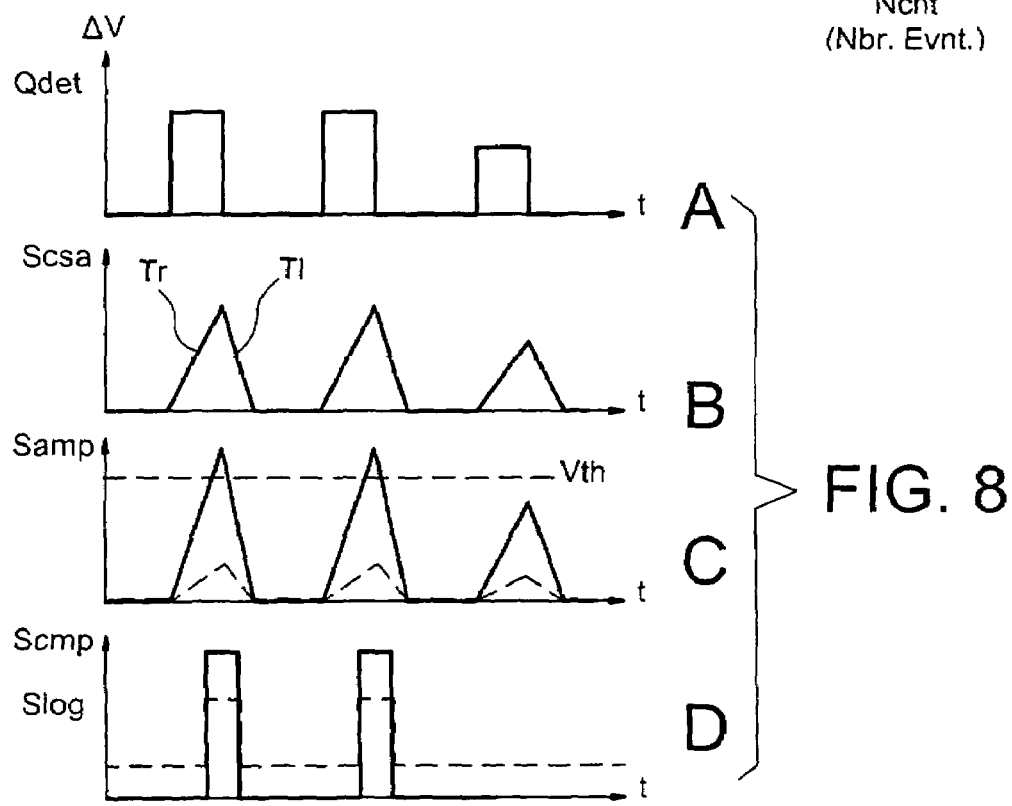
Figure 9A:
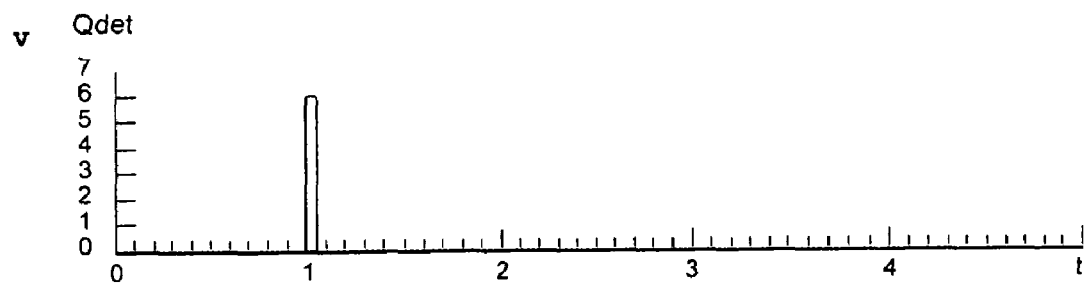
Figure 9B:
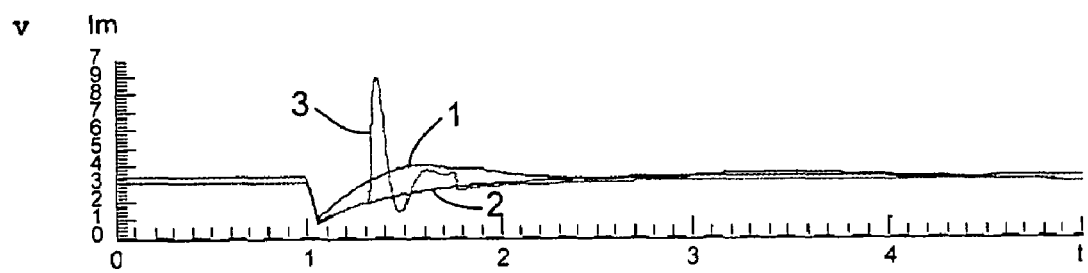
Figure 9C:
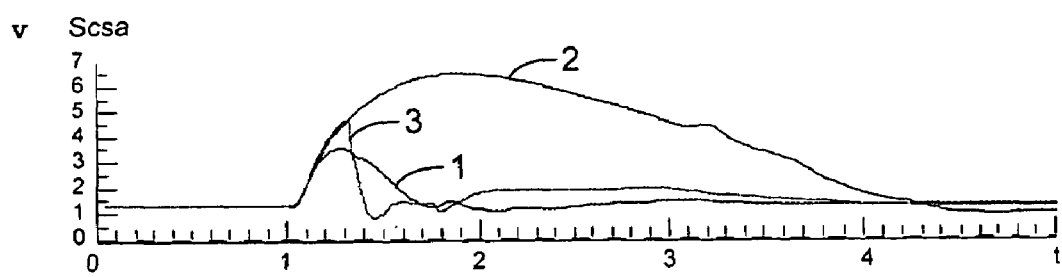
Figure 9D:
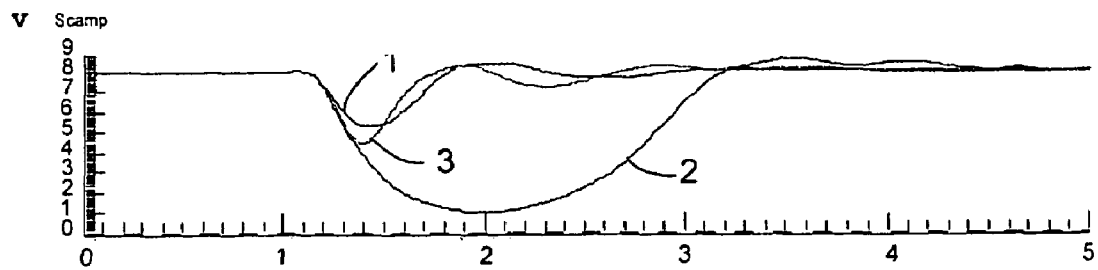
Figure 9E:
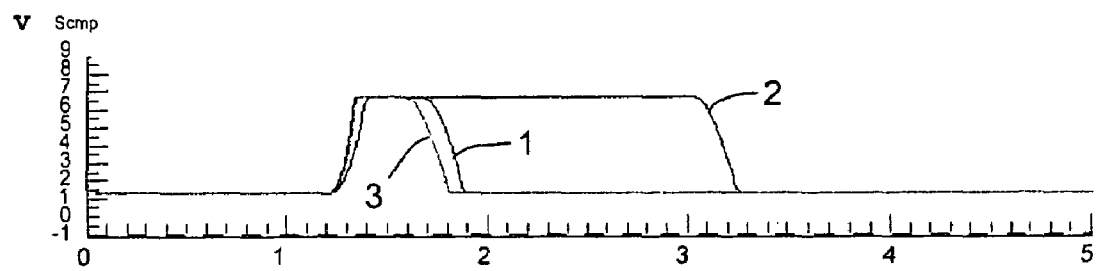
Figure 9F:
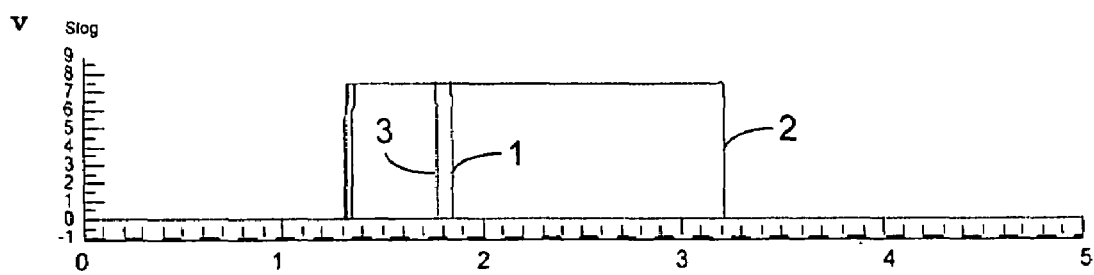

FIG. 7 illustrates a wiring diagram of an acquisition chain of a pixel or detector component DET of a radiation detection device according to the invention.

The detection entity (not shown) may be a detector unit, a group of discrete detector components or one or more layers of detector material forming a continuum of elementary detectors corresponding to a network of pixels.

The acquisition chain includes an analog portion PPC forming a circuit for processing and shaping pulses from the detector DET, followed by a logic portion BCC forming a binary counting circuit.

The analog portion PPC consists of a charge conversion stage CNVR with a CSA amplifier mounted as an integrator, followed by a pulse-shaping stage SHPR with an amplifier AMP in a band-pass filter circuit, and a third threshold crossing detection stage CMPR with an amplifier CMP in a comparator circuit.

The logic portion BCC includes a digital counting circuit NCT with a register REG with the function of being incremented at each detected event and retaining in memory the counting result Ncnt of the number of detected events, for transferring data to a readout system or an imaging system at the end of the irradiation period.

The first conversion stage CNVR is formed with a charge detector amplifier circuit for performing a conversion of electronic charges Qdet into a voltage level Scsa.

The amplifier CSA is configured as an integrator circuit or as a low pass filter circuit with a circuit loop IOL connecting the output Scsa of the amplifier CSA to an input IN of the CSA amplifier.

According to the embodiment in FIG. 7, the IOL circuit includes a capacitance Cf, a resetting component RAZ and a switching component SWT connected in parallel between the output Scsa and the input IN of the CSA amplifier.

The invention aims at giving more importance to the charges/voltage conversion gain of the CSA amplifier circuit of stage CNVR by minimizing the negative effect of the discharge current Iraz on the amplitude of the signal Scsa of detection pulses obtained at the output of the CSA amplifier.

As soon as the charge pulse is detected, the generated pulse signal is used for interrupting the conversion process CNVR.

Management of the interruption is provided by a control loop controlled by the signal Slog which acts on the charge converter stage CNVR via the electronic switch SWT positioned in parallel to the continuous discharge device RAZ.

According to the invention, the acquisition chain therefore includes a control loop, or in other words, a feedback or counter-reaction loop, connected between a point downstream from the output of the conversion stage CNVR and the charge conversion amplifier circuit CSA of this CNVR stage.

According to the embodiment illustrated in FIG. 7, the feedback FDBK of the acquisition chain performs a loopback from the digital counting portion BCC towards the first stage CNVR of the analogue portion of the chain.

According to this embodiment, the feedback loop FDBK controls the switching component SWT.

In the embodiment of FIG. 7, the feedback loop stems from the digital portion BCC of the acquisition chain downstream from the CNVR stage containing the switch SWT, so that logic signals may advantageously be applied for controlling the switching component SWT.

More specifically, according to the example of FIG. 7, the feedback loop connects the output Slog of the logic level pulse signal from the inverting gate LOGT interposed between the output Scmp of the comparator CMP and the incrementation terminal of the counter CNT. In operation, the signal of calibrated pulses SLOG which increments the binary counter CNT-REG is therefore retransmitted through the feedback loop FDBK onto the charge conversion stage CNVR.

In the embodiment of FIG. 7, the circuit of the conversion stage CNVR therefore includes a capacitance Cf, a resetting component RAZ and a switching component SWT connected in parallel between the output Scsa and the input IN of the CSA amplifier.

In order to obtain a maximum integration rate, the value of the feedback capacitance Cf is reduced to a minimum.

In certain practical embodiments, the amplifier circuit does not include any capacitor connected between the input IN and the output Scsa of the amplifier because the feedback Scsa/IN capacitance Cf is reduced (levelled) to the irreducible parasitic capacitance which exists between the input and the output of the amplifier component. In this case, there actually is no specific capacitor component in the amplifier circuit of the charge conversion stage.

The resetting system RAZ discharges the capacitance Cf according to a maximum current value Iraz. The resetting system RAZ may for example be formed with a source of current with value Iraz or with a resistive component having a value of resistance R corresponding to the value of the maximum current Iraz when the voltage across the terminals of the capacitance Cf reaches a peak voltage value.

According to an embodiment, a source of current with value Iraz, is formed by a polarized transistor circuit so that its saturation current corresponds to the maximum current value Iraz.

According to the first embodiment of the invention, the circuit loop IOL comprises a switching component SWT. The device SWT may be formed with a switch directly connecting the input IN and output Scsa terminals of the amplifier, so as to provide a short-circuit when the contact of the switch SWT is closed, and an open circuit when the switch SWT is open.

In the first embodiment, the switch SWT is connected in parallel to the IN/Scsa terminals of the IOL circuit, and therefore of the capacitance Cf and the current source Iraz.

The switching component SWT is controlled by the feedback loop FDBK, stemming from the digital portion BCC of the acquisition chain.

FIGS. 8A-8D schematize the appearance of the main pulse signals Qdet, Scsa, Samp, Scmp and/Slog at different stages in the acquisition chain PPC-BCC during a typical operating phase of the device according to the invention.

Initially, at rest, as illustrated in the diagram 8D, the signal Scmp has a low level 0, and the signal Slog is also in a low logic state (inactive). The inactive state of the signal Slog transmitted by the feedback loop FDBK maintains the switch SWT open, by convention in the exemplary embodiment of FIG. 7.

An event of capture of a photon or a particle by the detector component, DET, causes the generation of a charge packet Qdet which causes a short current and/or voltage pulse to occur at the input IN of the initial conversion stage CNVR.

The capacitance Cf of the integrator circuit of the amplifier CSA collects, accumulates, and stores the electronic charge Qdet from the detector DET. Consequently, the output signal voltage Scsa suddenly rises to attain a voltage peak with a peak value $Scsa_{MAX}$ ($Scsa_{MAX} \cong Qdet/Cf$).

The rise time Tr of the output signal Scsa depends on the rise rate of the amplifier which is related to conditions of polarization, in particular to the polarization current Ipol1 of the CSA amplifier.

The Samp signal of the second stage SHPR reproduces the pulse of the Scsa signal by changing its amplitude (and its shape). When the level of the signal Samp crosses the threshold level Vth schematized in diagram 8C, the comparator CMP delivers a high level pulse Scmp, which corresponds to the transition of the Slog logic signal to the high level (active).

The change of state of the logic signal Slog causes incrementation of the binary counter CNT by one unit.

At the same time, the feedback loop FDBK according to the invention then transmits a close command (Slog active) to the switching device SWT.

Closing of the switch SNT causes a short-circuit at the terminals of the capacitance Cf and quasi-immediate discharge of the capacitance Cf.

Consequently, as illustrated in diagram 8B, the output level Scsa of the charge converter stage CNVR falls within a very short time interval T1, by means of the invention.

As soon as the output level Samp falls below the threshold level Vth, the comparator releases the high level of the output pulse Scmp.

Consequently, advantageously according to the invention, the acquisition chain is again ready for processing a new pulse Qdet from the detector DET.

All the signals Scsa, Samp, Scmp and Slog have then returned to their idle level, 0 here, and the switch SWT is again opened by the inactive state of the signal Slog. The circuit CNVR with a polarized CSA amplifier resumes its level for polarizing the detector DET at the input IN.

Advantageously, the invention eliminates the dazzle time in radiation detection and event acquisition systems.

Indeed, if the radiation detector generates a charge pulse Qdet, immediately after the counting pulse Scmp/Slog, the acquisition chain NVR/SHPR/CMPR/BCC is then ready for processing the pulse and recording the event.

Consequently, as it is apparent by comparing the diagrams of FIGS. 4A-4D and 8A-8D, the acquisition chain according to the invention may operate at a much higher event counting frequency (or rate).

In the exceptional case when a second event would begin before completing the processing of a first event, the acquisition chain according to the invention is entirely reset upon completing the processing of the first event, without taking into account the new event. The chain is ready to process a future third event and to record the corresponding pulse, in spite of the second intermediate event.

Thus, by means of the invention, there is no shifting of the average output potential Scsa, Samp of the amplification stages CNVR and SHPR.

Advantageously, with the invention, it is therefore possible to suppress the phenomenon known as <<base line shifting>>.

Stated otherwise, there is no saturation of the acquisition chain according to the invention.

Thus, advantageously, the device according to the invention prevents any saturation of the acquisition chain by accumulation of pulses and inhibits the effects of a pile-up of events.

Accordingly, the response of the device according to the invention no longer has any phenomenon of saturation, nor even of decrease in the counting results.

Figure 6:
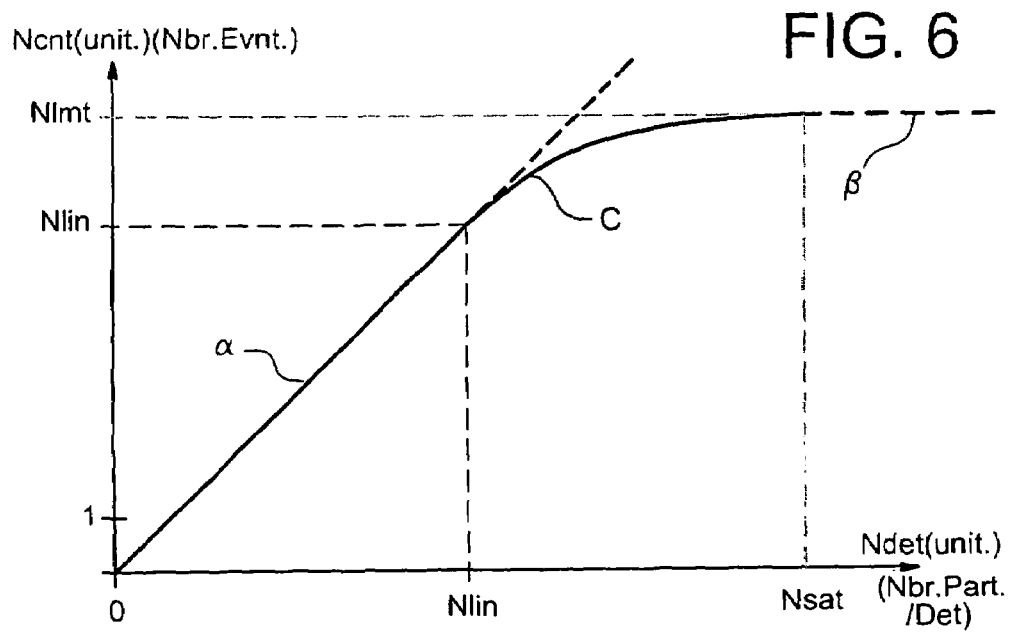
FIG. 6 illustrates a response curve of a device for measuring exposure to radiations according to the invention.

FIG. 6 illustrates the curve of the transfer function of a device according to the invention, the curve giving the number of counted events versus the number of photons or particles sensed by the detection entity.

The response curve of the device according to the invention has a monotonous increasing transfer function, the number of counted events increasing continuously according to the number of detection pulses from photons or particles sensed by the device.

The response curve of the transfer function of the device according to the invention tends to be strictly increasing between two asymptotes α and β.

The asymptote α corresponds to an axis passing through the origin O, according to which the number of counting events Ncnt is proportional to the number Ndet of particles or photons sensed by the detector, both of these numbers being substantially equal in the linear area (Ncnt=Nlin=Ndet).

While increasing, the number of counting events Ncnt tends towards an upper limiting number Nlmt represented by the asymptote β, when the number Ndet of photons and of particles sensed by the detector increases and tends towards infinity.

The upper limiting number Nlmt is given by the following formula:

$$Nlmt = Ti/\tau$$

with

Ti, the event counting period or the sampling period of the sensed images; τ is the time for handling an event with the acquisition chain.

Thus, the response curve of the device has only two distinct areas which appear on the typical appearance of the curve of FIG. 6:

a linear response area α [O; Nlin] (number Ndet of sensed particles corresponding approximately to the number Ncnt of counted events up to a linearity limit Nlin): an area where the response is substantially linear (proportional); this is the rated operating area of the device.

a response area β [Nlin; Nlmt]: an area beyond the linearity limit Nlin, in which the transfer function remains a monotonous increasing function; this is an operating area in which the response is exploitable (after application of a systematic correction factor, for example, or with reference to a calibration abacus), although the transfer function is no longer linear.

Figure 1:
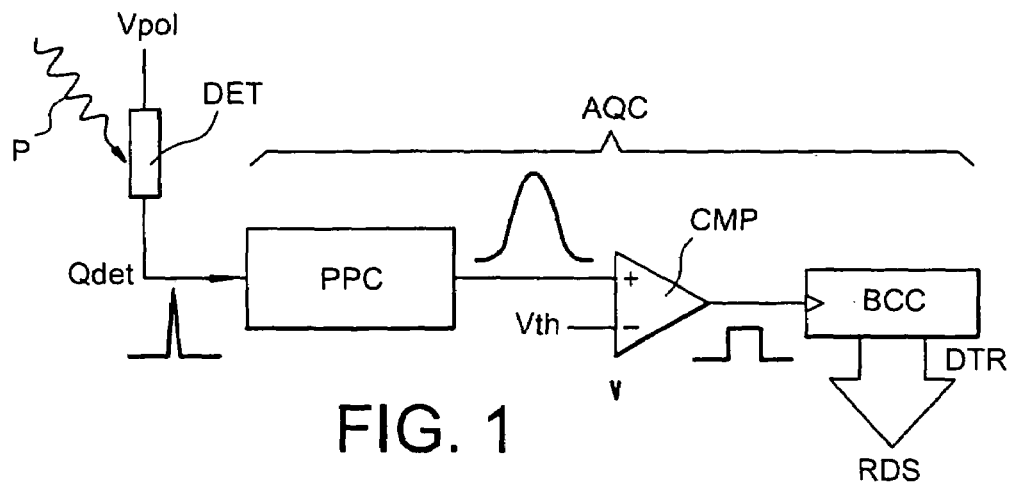
FIG. 1 illustrates a block diagram of a detector acquisition chain of a known type.
Figure 2:
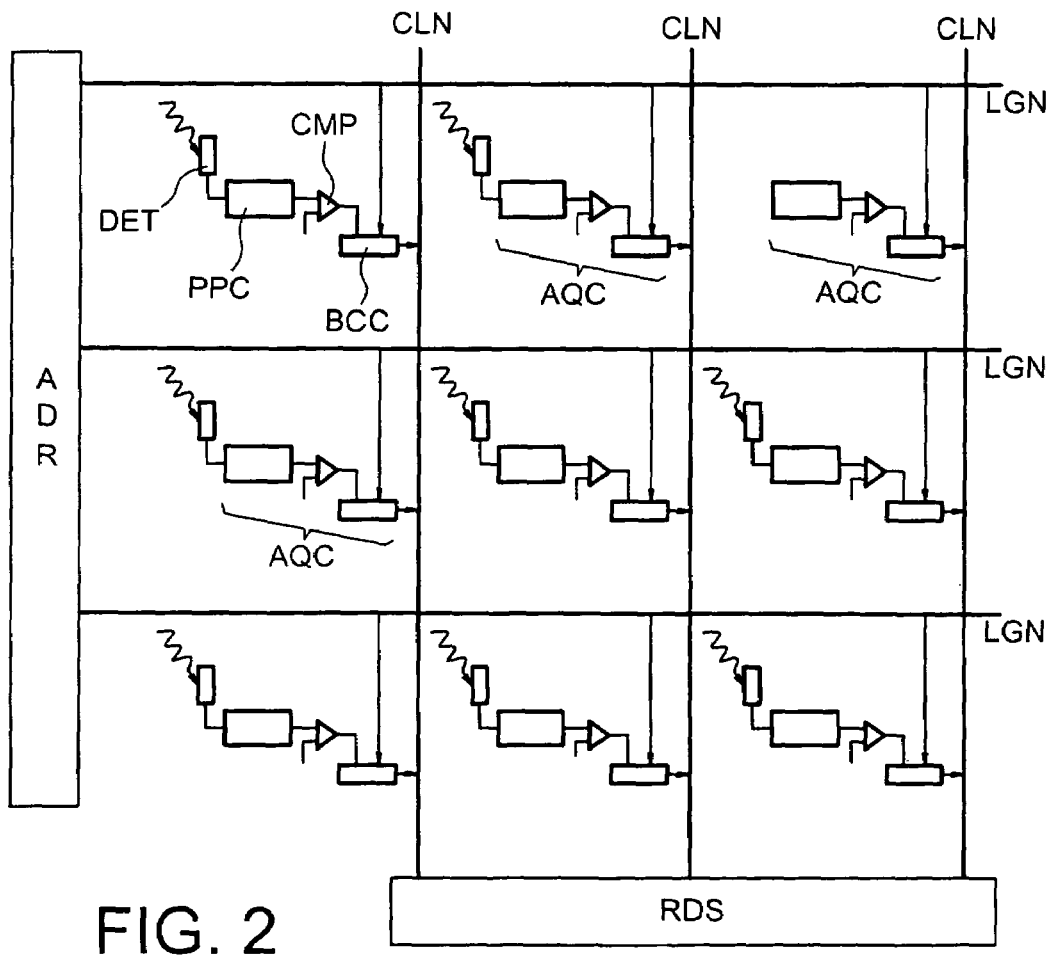
FIG. 2 illustrates a matrix architecture of a detection device of a known type.
Figure 3:
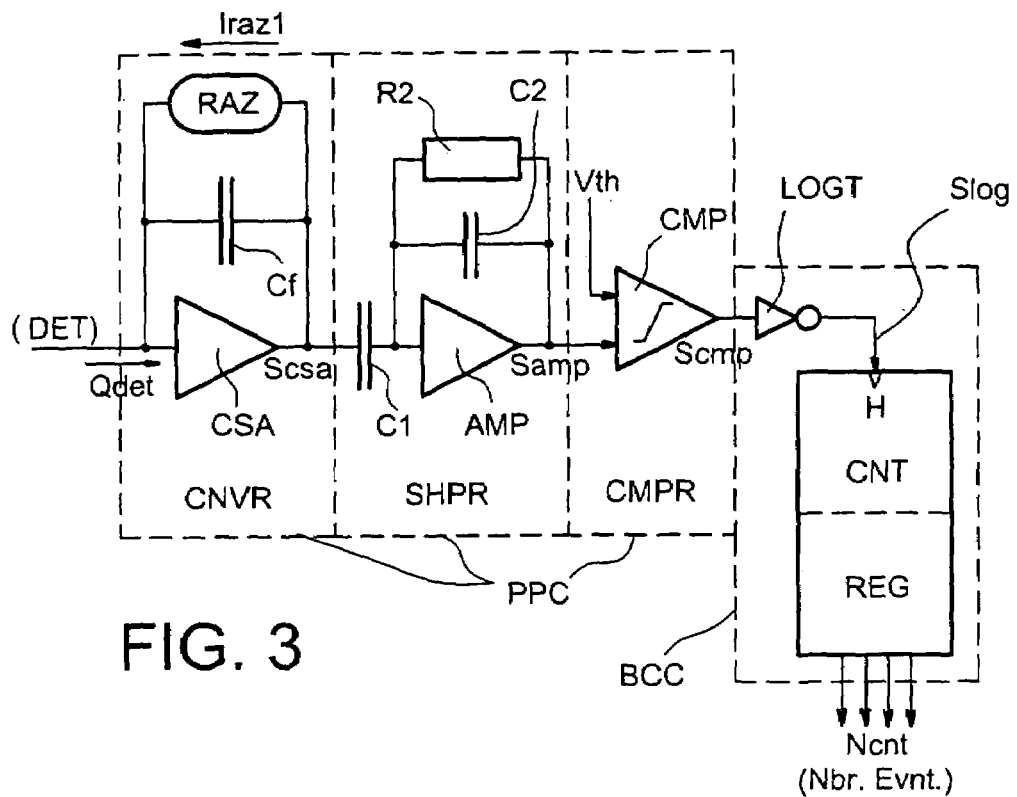
FIG. 3 illustrates an electronic diagram for producing a detector acquisition chain according to the state of the art.
Figure 4:
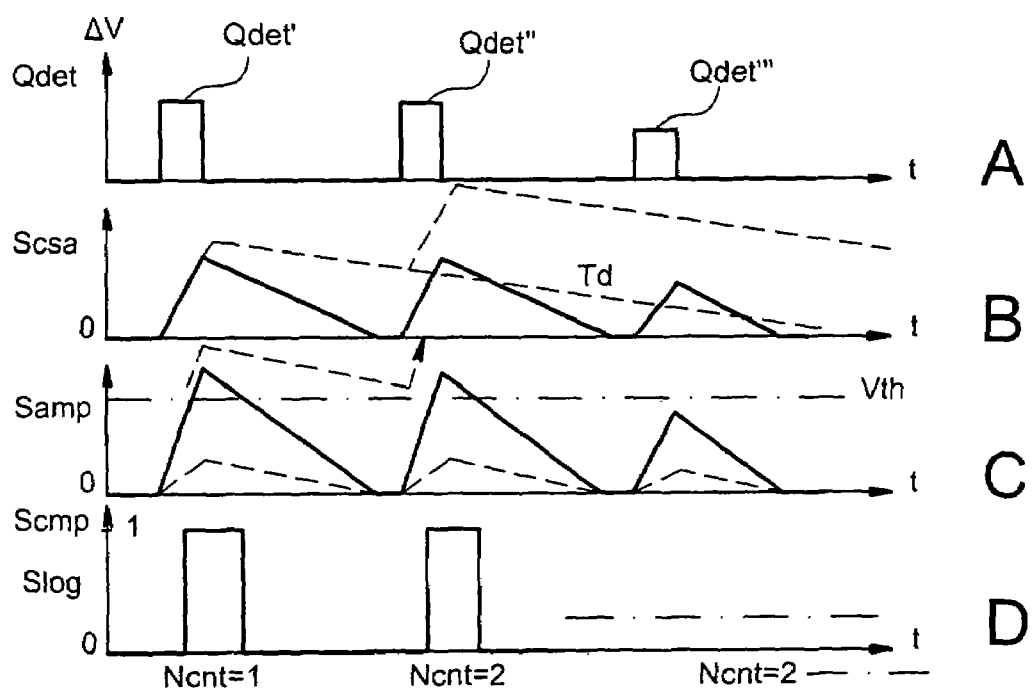
FIGS. 4A-4D illustrate diagrams of pulse signals in an acquisition chain according to the state of the art.
Figure 5:
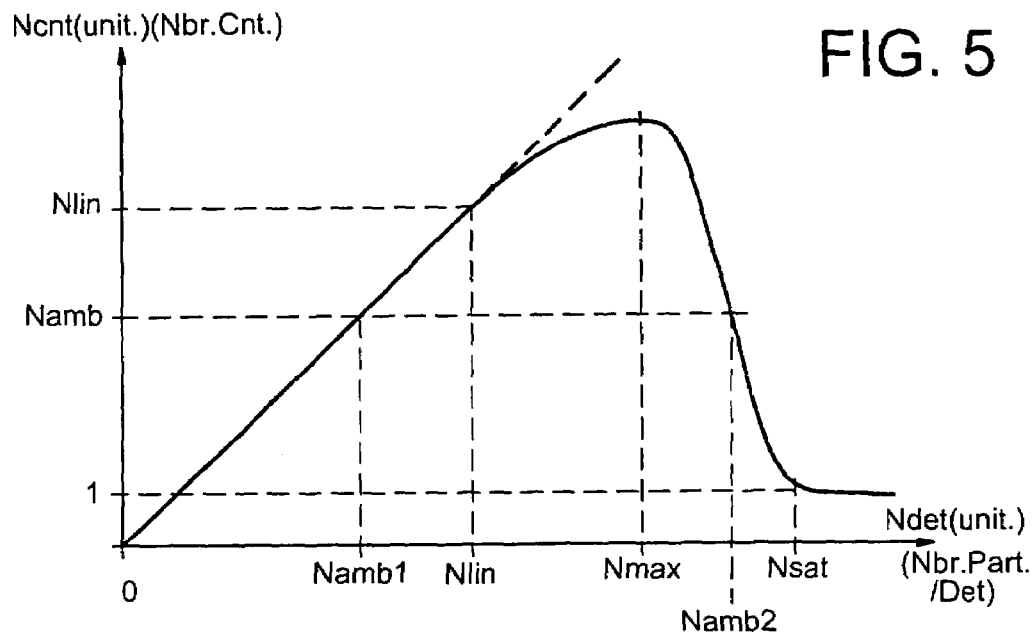
FIG. 5 illustrates a response curve of a radiation detection device according to the state of the art.

By comparing FIGS. 5 and 6, it emerges that the response of the device according to the invention does not include any decreasing area beyond the increasing non-linear area β.

The response curve of a device according to the invention tends to a limit Nlmt, in terms of counted events Ncnt, which is larger than all the values that the device may count: in FIG. 6, Nlmt is larger than any value counted by the device.

Advantageously, according to the invention, each value of the number of events counted by the acquisition chain corresponds to one and a single value of the number of particles/photons sensed by the detector. There is no longer any counting result value Ncnt ambiguously corresponding to two values of the number of photons/particles sensed by the detector. Consequently, there is no longer any absurd result.

Above a certain number of photons (Nsat, FIG. 6) the device reaches the unexploitable value saturation range Nlmt, but moreover non-perturbing for the linear range unlike the prior art.

With the invention, it is also possible to optimize the rising front Tr and the falling front T1 of the output signal Samp of the conversion stage CNVR, independently, in the following way:

the rising front Tr of the signal Samp is determined by the polarization current Ipol1 of the CSA amplifier and by the discharge current Iraz of the capacitance Cf (and also by the current Ipol2 of the amplifier and by its transfer function). By setting the discharge current Iraz to a limited value with respect to the standard values in known devices, the actually converted amount of charges Qdet is maximized, which increases the rise rate of the front Tr and therefore the maximum peak value of the signal Scsa;

the falling front T1 according to the invention no longer depends on the current Iraz. The fall time T1 is considerably shortened by the establishment of the short-circuit SNT according to the invention.

Advantageously, with the invention, it is possible to get rid to a certain extent of the maximum counting frequency/pulse amplitude compromise.

Further, by being able to reduce the polarization currents Ipol1 and Ipol2 of the acquisition chain, it is possible to lower the overall consumption of the whole device with a matrix architecture.

In addition, according to alternative embodiments of the invention, discussed hereafter, it is again possible to reduce the time interval T1 to the shortest interval for returning to the equilibrium point by damping oscillation phenomena due to the capacitive discharge Cf into a switching circuit SWT without any resistor.

Accordingly, with the invention, it is possible to minimize the negative effect of the discharge current Iraz on the amplitude of the signal Scsa obtained at the output of the CSA amplifier in order to give importance to the charges/voltage conversion gain. For this purpose, provision is made for strongly reducing the current Iraz to an unconventional value IRAZMIN, taking into account the constraints on the counting frequency. It is thereby possible to make the most out of the available incident charges Qdet and subsequently to switch the comparator CMP as rapidly as possible. Once the pulse is detected, the signal Slog (or Scmp) is used for interrupting the slow process for returning to equilibrium, slowed down because of the reduced value of the current IRAZMIN.

Indeed, in order to increase the available amplitude at the CSA output, the current source RAZ is adjusted to a very small value IRAZMIN.

The value IRAZMIN may be optimized by minimizing it to a value slightly larger than the maximum continuous parasitic current of the detectors (a leakage current which generally corresponds to the darkness or drift current of the detector).

With a value IRAZMIN slightly larger than the maximum continuous parasitic current of the detectors, it is possible to get rid of false event counts.

With the invention, it is thereby possible to adjust the continuous discharge device RAZ in an unconventional way. Indeed, in order to increase the amplitude available on the output signal Scsa, the current Iraz is adjusted to a very small value Irazmin. The effect of Iraz during the transfer of charges Qdet from the detector DET into the capacitance Cf may thereby be reduced and the amplitude of the Scsa signal may therefore be increased for packets of given charges Qdet.

Another advantageous consequence of the invention, is that, as long as the Scsa signal (or its image Samp) does not reach the threshold value Vth of the comparator, the latter does not generate any Scmp pulse (therefore Slog is inactive) leading to maximum conversion yield for the packets of charges Qdet from the detector.

With this improvement in the yield, the gain requirements for the following stages may be slackened so that their polarization current may be reduced indirectly, and therefore finally the consumption of the detection device may be reduced, which is notably advantageous for a matrix imager.

FIGS. 9A-9F illustrate, for comparison purposes, the amplitude time diagrams for signals Qdet, In, Scsa, Samp, Slog, Scmp, respectively, measured on the corresponding stages of three acquisition chains having different configurations, in the following way:

the first curves of measurement results in grey lines (index 1) correspond to the signals of an acquisition chain according to the state of the art with a constant discharge current with a conventional value Iraz1;

the curves of results in black lines (index 2) correspond to signals of an acquisition chain according to the state of the art with a constant discharge current reduced to a small value Iraz2, for example ten times smaller than the conventional Iraz1 value; and, the curves of the results in clear lines (index 3) correspond to the signals of an acquisition chain with a double RAZ/SWT system with discharge and switched resetting according to the invention, wherein the constant discharge current Iraz is reduced to a small value Irazmin, for example ten times less than the conventional value Iraz1.

The comparison of the curves in grey lines (index 1) and in black lines (index 2) shows the advantage of reducing the current Iraz in order to maximize the instantaneous amount of charges, converted into a voltage.

The comparison of the curves in black lines (index 2) and in clear lines (index 3) shows the effect of the switched SWT driven by the feedback control FDBK for shortening the resetting time of the acquisition chain.

The comparison of these measurement results from an acquisition chain optimized according to the state of the art (index 1) and from an unoptimized chain according to the state of the art (index 2) with the measurement results of an acquisition chain according to the invention (index 3) which includes a source of reduced current Irazmin added to a discontinuous resetting circuit, shows the advantages of the solution proposed according to the invention.

According to another embodiment of the invention illustrated in FIG. 10, the resetting device includes two current sources, a source of constant discharge current Irazmin connected in parallel with an additional switched current Irazadd source. This double resetting device with two current sources is connected to the terminals Scsa and In between which the capacitance Cf is found.

Switching of the additional current Irazadd source is controlled by the Slog signal transmitted by the feedback loop FDBK, as described earlier.

Operation and control of the current sources in this resetting mode are performed in the following way:

During the phase for converting charges into voltage (rising front Tr and voltage peak Scsa) which follows the occurrence of the packet of charges Qdet, the absence of a Slog command (Scmp low, Slog high) keeps the switch SWT open and cuts off the additional current Irazadd source, so that the discharge current Iraz of the capacitance Cf has the value:

Iraz=Irazmin

During the resetting phase (return to the equilibrium point) corresponding to the falling front T1 which follows the crossing of the threshold Vth by the signal Samp, the control pulse Slog (Scmp is high, Slog is low) closes the switch SWT and connects to the circuit, the additional current Irazadd source with the capacitance Cf, so that its resetting current Iraz is:

Iraz=Irazadd+Irazmin

For the remainder of the cycle (idle at the equilibrium point Scsa=0) which follows the return of the signal Samp below the threshold level Vth (Scmp is low, Slog is high), the switch SWT remains open and the discharge current Iraz of the capacitance Cf is held at a value of:

Iraz=Irazmin

The arrangement of two current sources with a control value, a constant Irazmin source and a switched Irazadd source, provides the advantage of preventing the occurrence of a phenomenon of critical oscillations which would occur with a quasi-infinite discharge current Iraz and would be reflected in the potentials In and Scsa of the amplifier and on the polarization of the detector.

According to another embodiment of the invention, the double discontinuous resetting/constant discharge system according to the invention may be produced as a device with a variable current source controlled by the feedback loop FDBK in order to generate several values of resetting/discharge currents I1 and I2 (with I2>I1).

The first lower value of the current I1 may notably be minimized to a current value Irazmin hardly larger than the noise or darkness current of the detector. The second upper current value I2 may be an optimum current value corresponding to a minimum fall time T1.

In the preceding description of the embodiments, the feedback loop FDBK is looped back to the charge converter CSA circuit of the first CNVR stage of the acquisition chain.

According to another embodiment, as illustrated in FIG. 11, the feedback FDBK2 may be looped back onto the AMP amplifier filter circuit of the second stage SHPR for shaping pulses of the acquisition chain.

According to this embodiment, the resistive component R in parallel on the capacitor C2 which ensures positioning of the pole of the SHPR filter in the state of the prior art, may be replaced with a double resetting RAZ2/SWT2 device according to the invention.

A discharge current RAZ2 source and a switch SWT2 may thereby be connected in parallel with the capacitance C2 between the input (−) and output Samp terminals of the AMP amplifier of the second stage SHPR. The switch SWT2 is then controlled according to the invention by the feedback loop FDBK2.

The current source RZA2 may for example be embodied by a polarized transistor in order to deliver a maximum current Iraz2. In this case, the value of the dynamic resistance of the transistor advantageously plays the role of the filter cut-off resistor R2, and/or the role of the resistor R for limiting the resetting current.

According to the alternatives shown earlier, the double resetting device mounted on the second stage SHPR according to the invention, may also be formed with two current sources Irazmin/Irazadd (constant and switched) or with a source of variable current I1/I2 according to the block diagram of the previous embodiments.

More generally, the invention is applied to an acquisition chain including a different structure of amplifier stages, for example with one or two stages or with more than three amplification stages and with stages having the functions distinct from those discussed here.

According to still another embodiment, the feedback loop may be connected at the output of the comparator CMP and transmit to one of the previous stages, the pulse Scmp signal as a signal for switching the double resetting device according to the invention.

Generally, the feedback loop which controls the double resetting device according to the invention may be looped back between a point downstream from the double resetting device and the amplifier stage in which the device is found.

ADVANTAGES PROVIDED BY THE INVENTION

Generally, with the invention, it is possible to de-correlate the process for converting incident charges into voltage and the process for rapidly resetting the output levels of the amplifier stages in an acquisition chain of a radiation detection device.

Adding in parallel an interruption device may contribute to the speed of the continuous RAZ chain during the phase for returning to the equilibrium point. Further, to make this device, it is sufficient to simply add a switching component SWT driven by the logic pulse SLOG signal in parallel with the discharge RAZ device (adjusted to Irazmin).

The advantages of this architecture are the following:

This is a purely analog chain, without any driving clock in the analog portion (therefore no switching parasitics) with stable static idle points. Further, if the detector has a darkness current less than the discharge current Iraz of the CAS amplifier circuit, this leakage current no longer has any influence on the operation of the analog acquisition chain for each pixel, as it is immediately and permanently suppressed by the discharge device RAZ.

Advantageously, from the moment following the count of an event, each pixel is exactly repositioned at its idle point which is specific to it. The only noise sources are those related to electronics, which are inevitable.

Because of its function, the current Iraz of the discharge RAZ device requires little accuracy and no homogeneity between the pixels. Thus, the architecture and implementation constraints may be slackened.

Advantageously, the double resetting device according to the invention, occupies very little space in the implementation diagram of the acquisition circuit of an acquisition chain. This is particularly important for producing an acquisition chain under a pixel in a detection device matrix structure.

Consequently, the invention may be applied in simple and robust architectures which have already demonstrated their reliability.

APPLICATIONS OF THE INVENTION

The invention may be applied to the production of any type of detection device and device for measuring exposure to radiations.

The invention is particularly applied to producing imaging detectors used in radiology, a field in which X-ray photons are detected in this case. However, it is clear that the invention applies to the detection of any type of photon or particle.

Advantageously the device is particularly applied to producing detectors arranged according to a matrix architecture, notably to matrix sensors formed with a network of pixels, as used in imaging.

Other applications, alternatives and embodiments may be applied by one skilled in the art without departing from the scope of the present invention.

The invention claimed is:

1. A device for measuring exposure to radiations comprising:
at least one component for detecting photons or particles, associated with at least one circuit for acquiring and counting detection events, the acquisition circuit including a pulse signal processing circuit delivering count pulses corresponding to detection events, a continuous discharge device configured to continuously reset the pulse signal processing circuit, and a discontinuous resetting circuit configured to discontinuously reset the pulse signal processing circuit.

2. The device according to claim 1, wherein a response curve of a number of counted events versus a number of photons or particles sensed, by each detection component, is a monotonous increasing curve.

3. The device according to claim 2, wherein the response curve has a first response range that increases substantially linearly, the number of counted events increasing proportionally to the number of sensed photons or particles, followed by a second response range that is simply increasing, the number of counted events continuing to increase or remaining stable as long as the number of sensed photons or particles increases.

4. The device according to claim 1, further comprising a detection element including a plurality of elementary detectors respectively associated with a plurality of circuits for acquiring and counting events forming an electronic processing entity arranged according to a matrix layout.

5. The device according to claim 1, wherein said continuous discharge device triggers a resetting current in a charge accumulation stage of the acquisition circuit.

6. The device according to claim 5, wherein a discharge current of the charge accumulation stage assumes a first value during the idle times and a second value when detecting an event, the second value being larger than the first value.

7. The device according to claim 6, wherein the first value of the discharge current of the charge accumulation stage during the idle time is adjusted to a value of an order of parasitic, leakage, or darkness current of the detector component.

8. The device according to claim 1, wherein said discontinuous resetting circuit triggers after each detection event, rapidly or after a charge-to-pulse conversion phase, return to an idle operating point of an amplification stage of the acquisition circuit.

9. The device according to claim 1, wherein said continuous discharge device triggers capacitive means of a charge accumulation stage in response to each detected event.

10. The device according to claim 9, further comprising means for shortening discharge of the capacitive means.

11. The device according to claim 1, further comprising means for generating two discharge current values in a charge conversion stage.

12. The device according to claim 1, further comprising means for switching a discharge current value in a charge accumulation amplifier stage.

13. The device according to claim 1, wherein a charge conversion stage includes a continuous discharge current source and a triggered or switched discharge current source.

14. The device according to claim 1, further comprising switching means for short-circuiting capacitive means of a charge conversion stage.

15. The device according to claim 1, wherein the acquisition circuit comprises a charge accumulation stage comprising a current source and a switch connected in parallel to input and output terminals of an amplifier and/or a capacitance.

16. The device according to claim 1, wherein the acquisition and counting circuit comprises a feedback or counter-reaction loop between a point downstream from a charge accumulation stage and said stage.

17. The device according to claim 16, wherein the continuous discharge device is applied to said accumulation stage.

18. The device according to claim 16, wherein the feedback loop retransmits signals of count pulses.

19. The device according to claim 16, wherein the feedback loop transmits a signal from a threshold comparator stage.

20. The device according to claim 16, wherein the feedback loop controls switching means connected to terminals of the charge accumulation stage.

21. The device according to claim 16, wherein the feedback loop controls a discharge current source.

22. The device according to claim 1, further comprising means for increasing rise amplitude of a pulse signal emitted during each detection event associated with means for reducing fall time of said signal.

23. The device according to claim 1, further comprising a charge sensing amplifier and wherein said continuous discharge device is connected in parallel with a switch between an output and an input of the charge sensing amplifier.

24. The device according to claim 23, wherein said continuous discharge device and said switch are connected in parallel with a capacitance.

* * * * *